(12) United States Patent
Ikekawa

(10) Patent No.: US 6,687,298 B1
(45) Date of Patent: Feb. 3, 2004

(54) METHOD AND APPARATUS FOR EXPANDING MOVING PICTURES BY SOFTWARE

(75) Inventor: Masao Ikekawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/527,364

(22) Filed: Mar. 17, 2000

(30) Foreign Application Priority Data

Mar. 19, 1999 (JP) ............................................. 11-076130

(51) Int. Cl.[7] ................................................. H04N 7/12
(52) U.S. Cl. .................................................. 375/240.15
(58) Field of Search ....................... 375/240.15, 240.25, 375/240.14; 348/423.1; 382/233, 236; 370/389

(56) References Cited

U.S. PATENT DOCUMENTS

| | | | | |
|---|---|---|---|---|
| 5,694,173 A | * | 12/1997 | Kimura et al. | 348/423.1 |
| 5,761,343 A | * | 6/1998 | Haruma et al. | 382/236 |
| 5,818,533 A | * | 10/1998 | Auld et al. | 375/240.14 |
| 5,838,678 A | * | 11/1998 | Davis et al. | 370/389 |
| 5,933,195 A | * | 8/1999 | Florencio | 375/240.15 |
| 6,088,391 A | * | 7/2000 | Auld et al. | 375/240.15 |
| 6,148,032 A | * | 11/2000 | Pearlstein et al. | 375/240.15 |
| 6,157,741 A | * | 12/2000 | Abe et al. | 382/233 |
| 6,385,248 B1 | * | 5/2002 | Pearlstein et al. | 375/240.25 |
| 2001/0012402 A1 | * | 8/2001 | Ozaki | 382/233 |

* cited by examiner

Primary Examiner—Chris Kelley
Assistant Examiner—Allen Wong
(74) Attorney, Agent, or Firm—Scully, Scott, Murphy & Presser

(57) ABSTRACT

A moving picture expansion method and apparatus is disclosed wherein, when expansion processing of a frame is conducted, if the frame is a B picture and the next frame is also a B picture, expansion processing of the adjacent two frames is simultaneously conducted by alternately repeating expansion processing for one macro block of the first frame and expansion processing for one macro block of the second frame and, when expansion processing of a frame is conducted, if the frame is a B picture and the next frame is also a B picture, expansion processing of the adjacent two frames is simultaneously conducted by alternately conducting expansion processing for a certain fixed number of macro blocks of the first frame and expansion processing for a certain fixed number of macro blocks of the second frame.

21 Claims, 5 Drawing Sheets

(A) ORIGINAL PICTURE (B) ORDER OF COMPRESSION AND EXPANSION (C) ORDER OF DISPLAY

METHOD AND APPARATUS FOR EXPANDING MOVING PICTURES BY SOFTWARE

BACKGROUND OF THE INVENTION

1. Field of the Invention

This invention relates to a technology for expanding compressed moving picture data, more specifically to a technology for effectively accessing a cache memory when expansion processing of moving picture data is executed by software.

2. Description of the Related Art

As a method of compression and expansion for storing and transmitting high quality moving picture data, an international standard method called the MPEG (Moving Picture coding Experts Group) is established. Since an enormous amount of calculation is required for expanding compressed moving picture data to real time data in conformity with the standard of the MPEG, specifically designed hardware has been conventionally used. However, due to the recent improvement in the performance of a microprocessor, it is becoming possible to realize the expansion of compressed moving picture data by software alone using an ordinary microprocessor.

Describing the expansion algorithm of the MPEG roughly, it consists of decoding processing of variable-length codes, reverse quantization processing, reverse discrete cosine transformation processing and motion compensation processing.

An MPEG expansion apparatus will be described for an example composed by a combination of a system with a CPU 401 as a core part and software on the CPU 401 as shown in FIG. 4.

A bit stream compressed by the MPEG is stored in an external storage 404. The bit stream is read out from the external storage 404 such as a CD-ROM and temporarily stored in a memory 402. The bit stream stored in the memory 402 is expanded by the function of decoding software operating on the CPU 401 and expanded picture data is stored in the memory 402. The picture data stored in the memory 402 is converted to a display format by software operating on the CPU 401 and transferred to a display 403. The decoding software is stored in advance in an external storage such as a floppy disc (FD) 407.

FIG. 5 shows an order of picture frames when an compression and an expansion are performed with the MPEG. The MPEG has three picture types for coding one frame of picture, namely the I picture, the P picture and the B picture. The I picture is of a picture type to be compressed using only information within the frame without any motion compensation processing performed. The P picture is of a picture type on which motion compensation processing is performed in that the frame is estimated from picture information of frames older than the frame. The B picture is of a picture type on which motion compensation processing is performed in that a picture signal of the frame is bi-directionally estimated from picture information of both frames older than the frame and future frames.

FIG. 5(A) shows an assignment of typical picture types when a moving picture is compressed with the MPEG. A Frame #1 is an I picture and is compressed without reference to picture information of other frames. A frame #2 is a B picture and is compressed by bi-directional motion compensation processing using the frame #1 and a frame #4. A frame #3 is also a B picture and is compressed by bi-directional motion compensation processing with reference to the frame #1 and the frame #4. The frame #4 is a P picture and is compressed by motion compensation processing using the frame #1. A frame #5 is a B picture and is compressed by bi-directional motion compensation processing using the frame #4 and a frame #7. A frame 6 is a B picture and is compressed by bi-directional motion compensation processing using the frame #4 and the frame #7. The frame #7 is a P picture and is compressed by motion compensation processing with reference to the frame #4. Arrows denoted by dotted lines show the reference relationship among the frames.

FIG. 5(B) shows a processing order of each frame when a compression and an expansion are performed in accordance with the above mentioned picture types. Before executing compression processing, input moving picture signals are realigned from the state of FIG. 5(A) to the state of FIG. 5(B).

The frame #1 being an I picture is compressed in the first place with the MPEG. Then the frame #4 being a P picture is compressed with reference to a local decoding picture of the frame #1. The frame #2 being a B picture is then compressed with reference to local decoding pictures of the frame #1 and the frame #4. The frame #2 being a B picture is compressed with reference to local decoding pictures of the frame #1 and the frame #4. The frame #3 being a B picture is compressed with reference to local decoding pictures of the frame #1 and the frame #4. The frame #7 being a P picture is compressed with reference to a local decoding picture of the frame #4. Following this, the frame #5 is compressed with reference to local decoding pictures of the frame #4 and the frame #7. The frame 6 is compressed with reference to local decoding pictures of the frame #4 and the frame #7.

Information of each frame is described in the order of compression of the frames in a MPEG bit stream describing the compressed pictures. That is to say, an order of frames to be input in an expander is different from an original order of moving picture frames.

When the MPEG bit stream compressed as above is expanded, the frame #1 is expanded first. Then the frame #4 (P picture) is expanded with reference to the picture of the expanded frame #1. The frame #2 (B picture) is expanded with reference to the two pictures of the expanded frame #1 and the expanded frame #4. The frame #3 (B picture) is expanded with reference to the two pictures of the expanded frame #1 and the expanded frame #4. The frame #7 (P picture) is expanded with reference to the picture of the expanded frame #4. Following this, the frame #5 is expanded with reference to the two pictures of the expanded frame #4 and the expanded frame #7. The frame #6 is expanded with reference to the two pictures of the expanded frame #4 and the expanded frame #7. FIG. 5(C) shows an order for displaying the expanded pictures on a display 403 of FIG. 4.

Decoding software, i.e. an operation by a program stored in a floppy disc of FIG. 4 will now be described with reference to a flow chart of FIG. 1.

In expansion processing of one frame, steps of a variable-length code decoding (step 102), a reverse quantization (step 103), a reverse DCT (step 104) and a motion compensation (step 105) are repeated for each macro block and, when the last macro block of one frame is processed, the expansion processing of one frame is finished (step 107). Further, the motion compensation processing (step 105) is not performed for an I picture. In addition, in the motion compensation processing (step 105), a one way motion compensation estimation is performed for a P picture and bi-directional motion compensation processing is performed for a B picture.

The variable-length code decoding (step 102) of one macro block reads out the bit stream stored in the memory 402 and decodes the Huffman code by referring to the variable-length code table for every few bits. Then, a pointer pointing a location on the memory stores a position where the bit stream was read out. The pointer is advanced for a read out amount every time the bit stream is read out and always points a location of a bit stream to be read out. The variable-length code table used here is stored in the FD 407 in advance together with the decoding software and is read into the CPU when the variable-length code decoding processing is carried out. A decoding result of the Huffman code is stored in a region on the memory 402 which is called a DCT coefficient buffer.

The reverse quantization (step 103) is processing for calculating the product of a value stored in the DCT coefficient buffer and a quantization parameter included in the MPEG bit stream. A result of the reverse quantization is written back to the above mentioned DCT coefficient buffer.

The reverse DCT (step 104) performs the two dimensional reverse discrete cosine transformation on the reverse quantized value stored in the DCT coefficient buffer. A result of the two dimensional reverse discrete cosine transformation is written back to the same DCT coefficient buffer.

The motion compensation (step 105), which utilizes the temporal redundancy of a moving picture, is processing for cutting out a portion of a picture from the already expanded frame to decode a picture. The position of the picture to be cut out is determined by a parameter (which is stored in the MPEG bit stream as well) called a motion vector. The region to be cut out is a square region called a macro block consisting of vertical 16 pixels and horizontal 16 pixels. With the cut out region added to the result of the reverse DCT stored in the DCT coefficient buffer, the expansion of the macro block is completed. The expanded macro block is stored in the memory 402.

In a system as shown in FIG. 4, a cache memory 405 is usually built in the CPU 401. The cache memory is a memory that is smaller in volume but can be accessed faster than an ordinary memory. Data of the memory 402 that the CPU 401 accessed recently is stored in the cache memory. Contents that have not been accessed for a long time since the last access are controlled so that they are excluded from the cache memory and written back in the memory 402.

That is to say, since data the CPU has accessed once is left in the cache memory so long as it is accessed right thereafter, it can be accessed again within the machine cycle of the CPU. This is called a cache hit. However, when accessing data which has not been accessed at all or that has excluded from the cache memory to the memory because it has not been accessed for a long time since it was accessed once, it take a few times or scores of times of the machine cycle of the CPU. This phenomenon is called a cache mistake. When a cache mistake occurs, processing speed of software is slowed because a processor has to read data from a memory. Therefore, it is important to make the probability of a cache mistake occurrence as low as possible in order to increase the processing speed of the software.

The volume of a cache memory built in a microprocessor that is currently available is several tens of kilobyte at the maximum. A secondary cache memory may be disposed outside the CPU 401 depending on the structure of a system. The volume of the secondary cache memory is larger than the volume of the cache memory built in the CPU. In general, the volume of the secondary cache memory is several hundreds of kilobyte at the maximum. Whereas, the volume of one frame of a picture to be handled with the MPEG may range from several tens of kilobyte to a few megabyte depending on a screen size. In the case of a standard called the MPEG 2 main profile/main level that is most generally used at present, a picture of one frame only can be stored in the secondary cache memory at most because the volume of one frame is several hundreds of kilobyte.

A behavior of the cache memory when an expansion of the MPEG 2 main profile/main level is carried out in a conventional expansion apparatus will now be described. For example, a series of actions for expanding the frame #2 of FIG. 5(B) and then expanding the frame #3 are described.

In motion compensation processing during the expansion processing of the frame #2, it is necessary to access picture for three frames in conjunction with a picture of the frame #2 to be expanded because the frame #1 and the frame #4 are referred to. Only parts of the frame #1, the frame #4 and the frame #2 respectively are stored in the cache memory when the expansion processing of the frame #2 is finished, since the picture for three frames cannot be stored in the cache memory. Since the expansion algorithm of the MPEG proceeds with the processing downward from the left to the right of the screen, in many cases, a frame to be referred to is accessed from the upper end to the lower end on the screen in order. Therefore, with the progress of the expansion processing, data in the area close to the upper end of the screen is excluded from the cache memory and data in the area close to the lower end is ultimately left in the cache memory.

Consequently in the motion compensation processing of the processing for expanding the frame #3, the frame #1 and the frame #4 are referred to again. When the area close to the upper end of the screen of the frame #3 is expanded, the areas close to the upper ends of the frame #1 and the frame #4 are to be referred to, but, since only data in the areas close to the lower ends of the frame #1 and the frame #4 is left in the cache memory as a result of the expansion processing of the frame #2, all the accesses causes a cache mistake. Further, since data in the areas close to the lower ends of the frame #1 and the frame #4 left in the cache memory are excluded when the expansion processing of the areas close to the upper ends are carried out, all the accesses even in the processing for expanding the area close to the lower end of the screen of the frame #3 cause a cache mistake.

As described in the preceding paragraphs, since the entire frame to be referred to in the motion compensation processing cannot be stored in the cache memory in the conventional moving picture expansion apparatus, cache mistakes frequently take place. Due to the frequent occurrence of cache mistakes, an identical reference frame must be read from the memory many times especially when a plurality of frames adjacent to each other are B pictures and, as a result, the speed of the decoding software is slowed down.

As mentioned above, since the cache memory within the CPU cannot be used effectively especially in the expansion processing of a B picture in the conventional moving picture expansion apparatus established with software, the processing speed becomes slow. That is to say, due to a frequent occurrence of cache mistakes, a waiting time for a memory access is a major factor of the reduced speed of the decoding software.

SUMMARY OF THE INVENTION

OBJECT OF THE INVENTION

The object of the present invention is to restrain a cache mistake in a motion compensation processing of a B picture and to provide a moving picture expansion technology in which reduced speed of a decoding software is prevented.

SUMMARY OF THE INVENTION

When expansion processing of a frame is conducted, it is a B picture and the next frame is a B picture as well, the present invention conducts expansion processing of the adjacent two frames by alternately repeating expansion processing for one macro block of the first frame and expansion processing for one macro block of the second frame.

Further, when expansion processing of a frame is conducted, if it is a B picture and the next frame is a B picture as well, the present invention conducts expansion processing of the adjacent two frames by alternately repeating expansion processing of a fixed number of macro blocks of the first frame and expansion processing of a fixed number of macro blocks of the second frame.

As mentioned above, in the present invention, if both the adjacent two frames are B pictures, since the expansion processing of the two frames are alternately conducted for one macro block or a plurality of macro blocks, the expansion processing of macro blocks in the same positions of the adjacent frames is consecutively executed. In doing so, the probability of a cache mistake occurrence in the motion compensation processing can be reduced. This is based on the characteristics that the motion compensation processing in the macro blocks located in the same positions of the adjacent frames often utilizes the regions in the positions close to them in the reference frames.

DETAILED DESCRIPTION OF THE PREFERRED EMBODIMENTS

Figure 2:
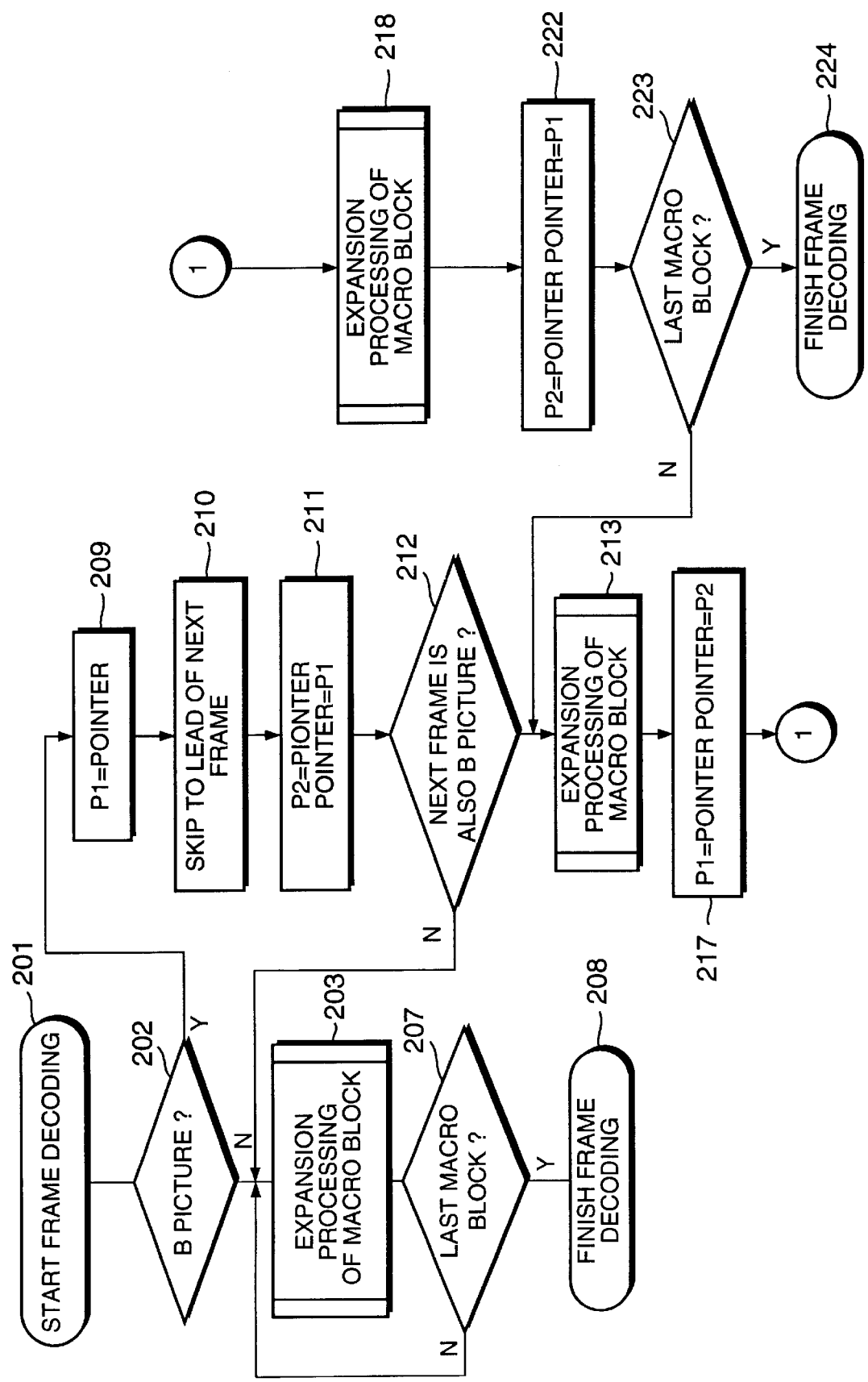
FIG. 2 is a flow chart showing an operation of the present invention.
Figure 3:
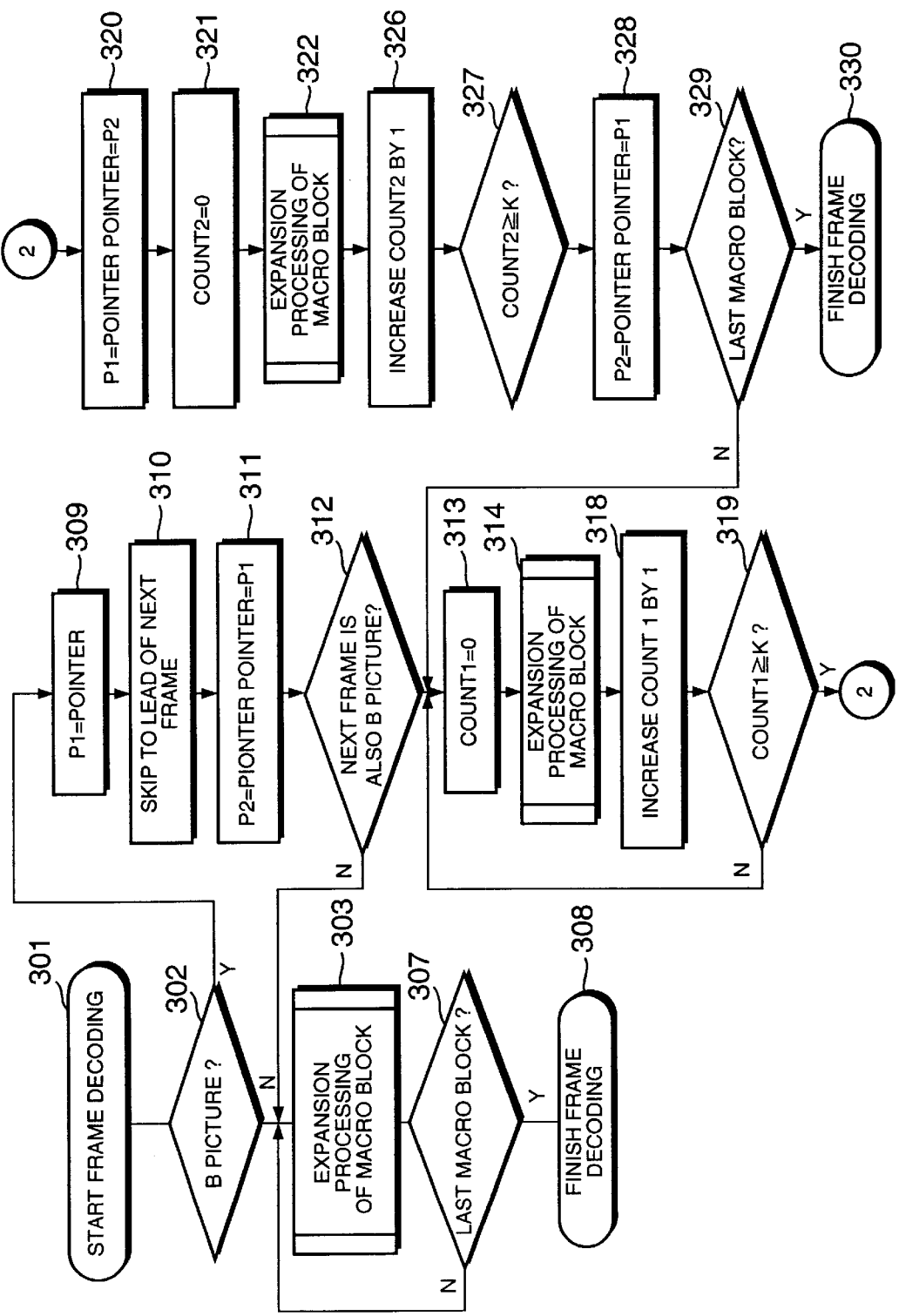
FIG. 3 is a flow chart showing an operation of the present invention.
Figure 4:
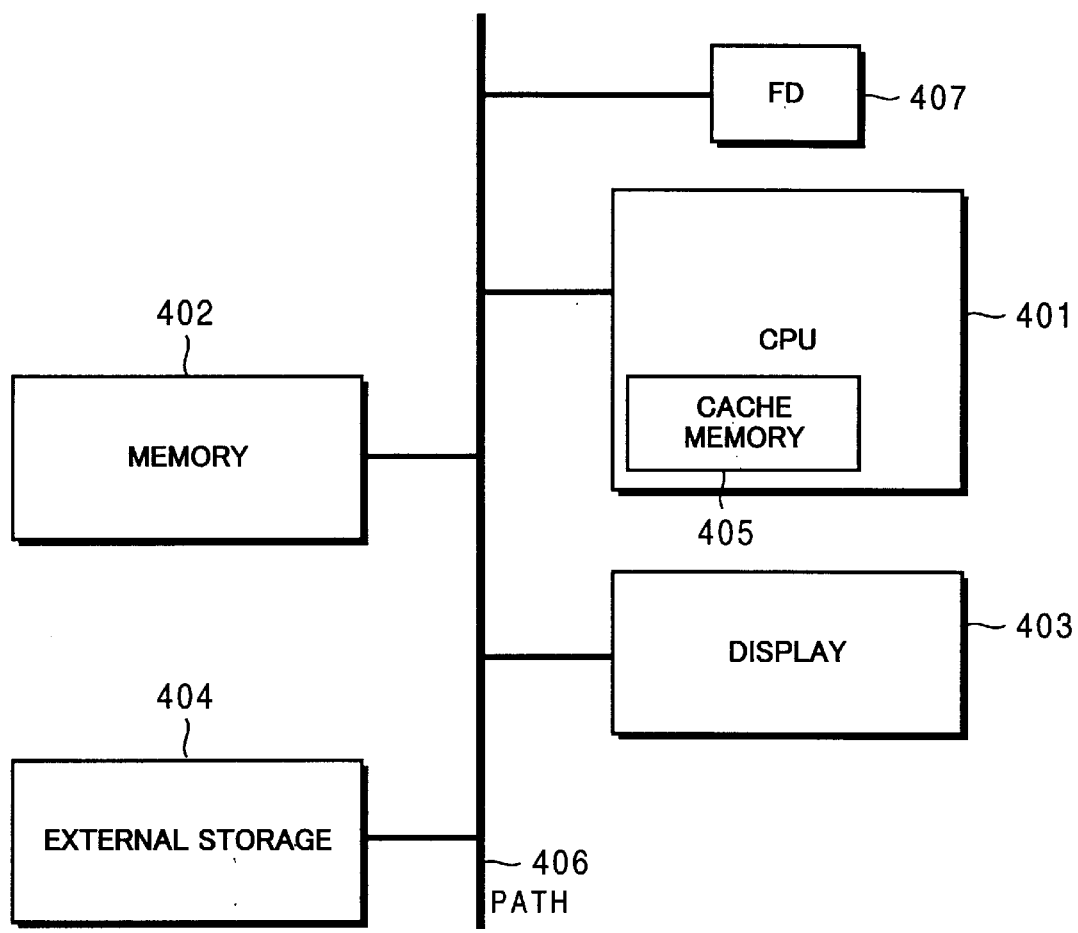
FIG. 4 is a block diagram showing a structure of the present invention.
Figure 5:
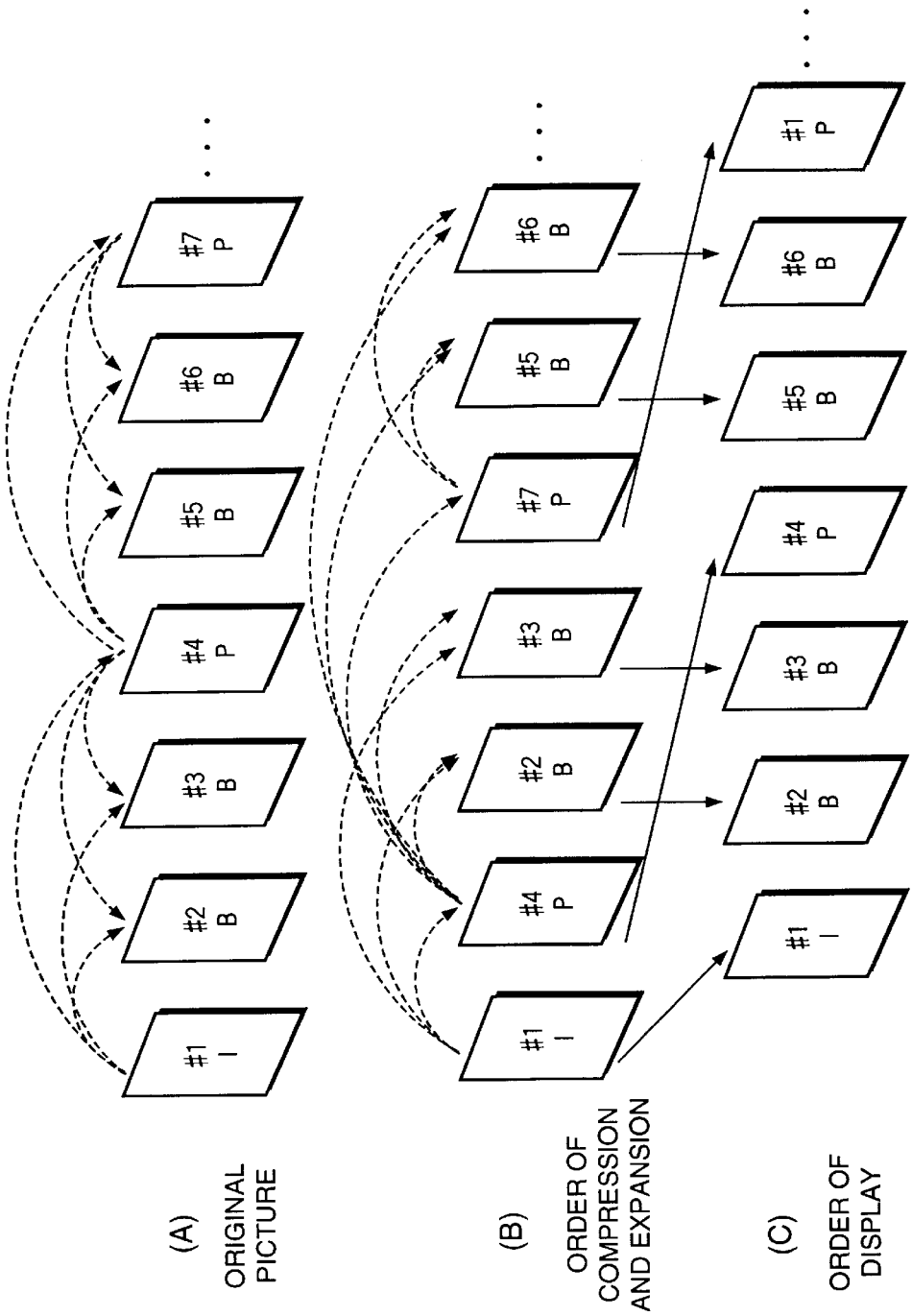
FIG. 5(A) is a schematic illustration showing an assignment of typical picture types when a moving picture is compressed with the MPEG.
FIG. 5(B) is a schematic illustration showing a processing order of each frame when a compression and an expansion are performed in accordance with picture types.
FIG. 5(C) is a schematic illustration showing an order for displaying the expanded pictures.

The only difference between the present invention and the prior art is a program stored in an external storage 407. A bit stream compressed with the MPEG is stored in an external storage 404. The bit stream is read out from the external storage 404 and temporarily stored in a memory 402. The bit stream stored in the memory 402 is expanded by the function of the decoding software operating on a CPU 401, as a result, a picture data is stored in the memory 402. A program hereinafter described with reference to a flow chart in FIG. 2 or FIG. 3 is stored in a floppy disc 407.

An operation of a first embodiment of the present invention will now be described with reference to a drawing. FIG. 2 is a flow chart showing an operation of the first embodiment of the present invention.

In expansion processing of one frame, whether a picture type of the frame is a B picture or not is first determined (step 202).

If the picture type of an input frame is an I picture or a P picture, expansion processing for one macro block (step 203; identical with steps 102 through 105 of FIG. 1) is repeated (step 203, step 207) as in the prior art and, when the last macro block of the one frame is processed, the expansion processing of the one frame is finished (step 208).

As a result of the determination in step 202, the picture type of the frame is assumed to be a B picture. The frame is tentatively called a frame X. In this case, a value of a pointer indicating a reading out position of a current bit stream is temporarily stored in a variable p1 (step 209) and bit streams are skipped to the lead of the next frame (step 210).

The next frame is deemed to be called a frame Y. A value of a pointer indicating a reading out position of a bit stream at that time is stored in a variable p2. Then, the value stored in the variable p1 is returned to the pointer (step 211). If the picture type of the frame Y is not a B picture (step 212), expansion processing of the frame X is conducted in the similar manner as an I picture or a P picture.

Figure 1:
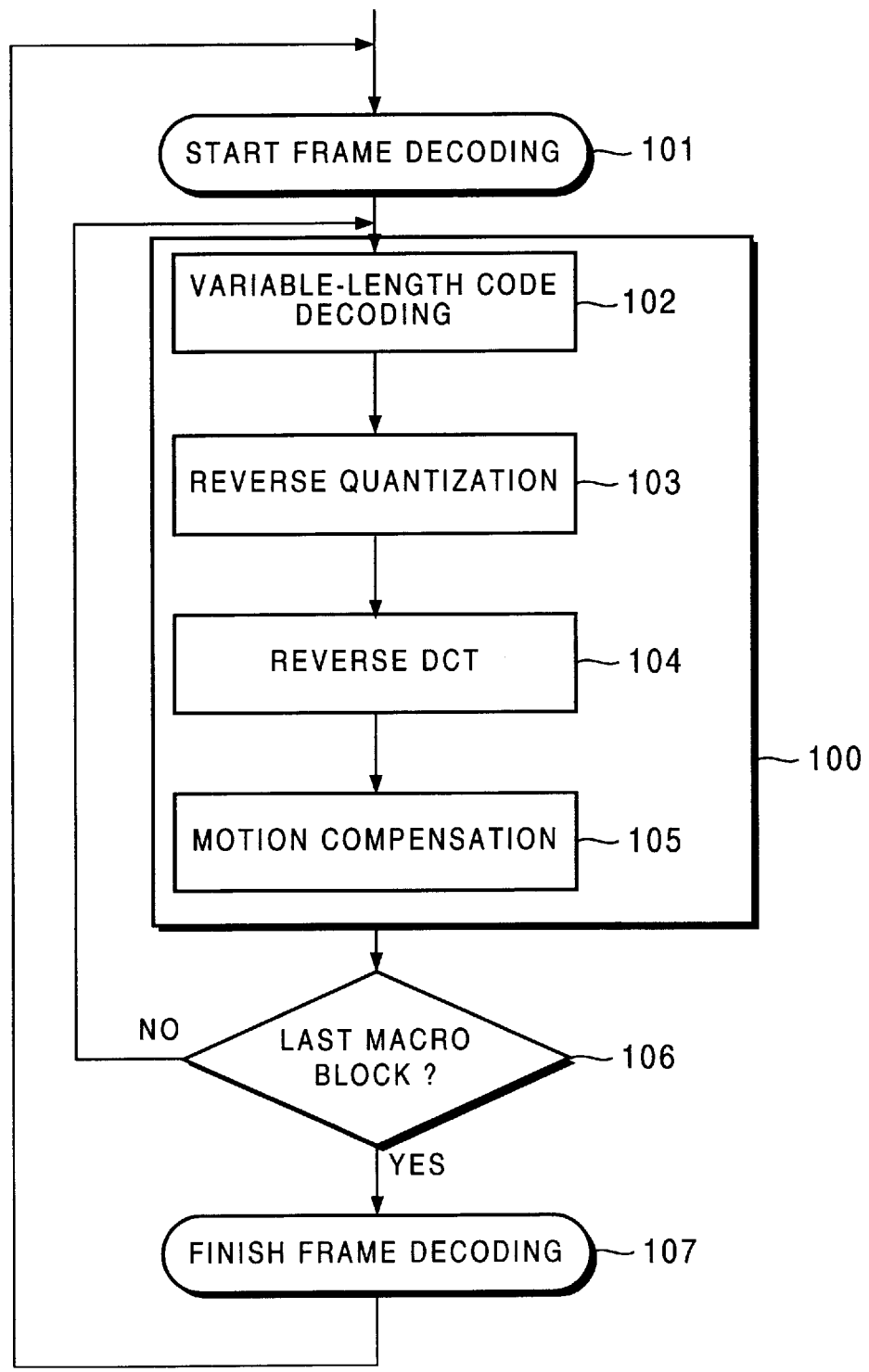
FIG. 1 is a flow chart showing an operation of a conventional art.

If the picture type of the frame Y is also a B picture, expansion processing for one macro block of the frame X (step 213; identical with the processing of steps 102 through 105 of FIG. 1) is conducted first.

The value of the pointer is then stored in the variable p1 and the lead position of the frame Y stored in p2 is returned to the pointer (step 217) and expansion processing for one macro block of the frame Y (step 218; identical with the processing of steps 102 through 105 of FIG. 1) is conducted.

The value of the pointer is then stored in the variable p2 and the reading out position of the bit stream stored in p1 is returned to the pointer (step 222) and expansion processing for one macro block of the frame X (step 113; identical with the processing of steps 102 through 105 of FIG. 1) is conducted.

The expansion processing of the frame X and of the frame Y are thereafter alternately repeated for each one macro block in the similar manner and, when the last macro block is processed, the expansion processing for two frames of the frame X and the frame Y is finished (step 224).

An operation of a second embodiment of the present invention will now be described with reference to a drawing.

FIG. 3 is a flow chart showing the operation of the second embodiment of the present invention. K is a certain constant. In expansion processing of one frame, whether the picture type of the frame is a B picture or not is determined first (step 302). If the picture type of the frame is an I picture or a P picture, expansion processing for one macro block (step 303; identical with the processing of steps 102 through 105 of FIG. 1) is repeated (step 303 and step 307) as in the prior art and, when the last macro block of the one frame is processed, the expansion processing of the one frame is finished (step 308).

As a result of the determination in step 302, the picture type of the frame is assumed to be a B picture. The frame is deemed to be called a frame X. In this case, a value of a pointer storing a reading out position of a current bit stream is stored in a variable p1 (step 309) and bit streams are skipped to the lead of the next frame (step 310). The next frame is deemed to be called a frame Y. The reading out position of a bit stream at that time is stored in a variable p2 and the value stored in p1 is returned to the pointer (step 311).

If the picture type of the frame Y is not a B picture (step 312), expansion processing of the frame X is conducted in the similar manner as an I picture or a P picture.

If the picture type of the frame Y is also a B picture, expansion processing for macro blocks of the number of K of the frame X (step 313, step 314, step 318 and step 319) is conducted first. Then, the value of the pointer is stored in the variable p1 and the value indicating the lead of the frame Y stored in p2 is returned to the pointer (step 320), and expansion processing for macro blocks of the number of K of the frame Y (step 321, step 322, step 326 and step 327) is conducted.

The value of the pointer is then stored in the variable p2 and the reading out position of the bit stream stored in p1 is returned to the pointer (step 328), and expansion processing for one macro block of the frame X (step 313, step 314, step 318 and step 319) is conducted.

The expansion processing of the frame X and of the frame Y are thereafter alternately repeated for the macro blocks of the number of K each in the similar manner and, when the last macro block is processed, the expansion processing for two frames of the frame X and the frame Y is finished (step 330).

An appropriate value of K is different depending on the size of the cache memory and the size of a picture to be expanded. For example, when a picture of the MPEG 2 main profile/main level with horizontal 720 pixels and vertical 480 pixels is expanded in a moving picture expansion apparatus including a cache memory of 256 kilobyte, K is deemed to be forty five that is the number of macro blocks in one horizontal row on a screen.

Incidentally, although an example for alternately conducting expansion processing of adjacent two frames if both the two frames are B pictures, if all of three or more adjacent frames are B pictures, it is possible to alternately conduct expansion processing of the three or more frames.

The effect of the present invention is to prevent a decoding software from slowing down by reducing cache mistakes in the motion compensation processing of a B picture.

In an embodiment of the present invention, if both of two adjacent frames are B pictures, expansion processing of a plurality of macro blocks in the same position as the adjacent frames is consecutively executed. In doing so, it becomes possible to effectively utilize data of reference frames to be read into a cache memory in the motion compensation processing and the probability of occurrence of cache mistakes can be lowered.

Thus, it is seen that a method and an apparatus for expanding moving pictures by software are provided. One skilled in the art will appreciate that the present invention can be practiced by other than the preferred embodiments which are presented for the purposes of illustration and not of limitation, and the present invention is limited only by the claims which follow.

What is claimed is:

1. A moving picture expansion method for conducting expansion processing of compressed moving picture data having a plurality of frames, each frame including a plurality of macro blocks, said method comprising the steps of:

determining whether a picture type of a plurality of consecutive frames is a B picture or not; and conducting expansion processing of each frame among said plurality of consecutive frames alternately for each one macro block.

2. A moving picture expansion method for conducting expansion processing of compressed moving picture data having a plurality of frames, each frame including a plurality of macro blocks, said method comprising the steps of:

determining whether a picture type of two adjacent frames is a B picture; and conducting expansion processing of each frame among said two adjacent frames alternately for each one macro block.

3. A moving picture expansion method for conducting expansion processing of compressed moving picture data having a plurality of frames, each frame including a plurality of macro blocks, said method comprising the steps of:

determining whether a picture type of a plurality of consecutive frames is a B picture; and conducting expansion processing of each frame among said plurality of consecutive frames alternately for every plurality of macro blocks.

4. A moving picture expansion method for conducting expansion processing of compressed moving picture data having a plurality of frames, each frame including a plurality of macro blocks, said method comprising the steps of:

determining whether a picture type of two adjacent frames is a B picture; and conducting expansion processing of each frame among said two adjacent frames alternately for every plurality of macro blocks.

5. The moving picture expansion method according to any one of claim 1 through claim 4, said expansion processing further comprising the steps of:

conducting decoding of the Huffman code with reference to a variable-length code table;

reverse quantizing the decoded results of the Huffman code;

reverse discrete cosine transforming the reverse quantized results; and expanding a picture based on the reverse discrete cosine transformed results and motion vectors.

6. A moving picture expansion method for conducting expansion processing of compressed moving picture data having a plurality of frames, each frame including a plurality of macro blocks, alternately conducting expansion processing of each frame among a plurality of adjacent B picture type frames on a constant number (K) of macro blocks in a corresponding position of each adjacent B picture type frame.

7. The moving picture expansion method according to claim 6, wherein said constant number K is one.

8. A moving picture expansion apparatus for conducting expansion processing of compressed moving picture data having a plurality of frames, each frame including a plurality of macro blocks, said apparatus comprising:

a CPU for determining whether a picture type of a plurality of consecutive frames is a B picture and conducting expansion processing of each frame among said plurality of consecutive frames alternately for each one macro block; and a cache memory for storing a part of said plurality of macro blocks within the consecutive frames to be referred to in said expansion processing.

9. A moving picture expansion apparatus for conducting expansion processing of compressed moving picture data having a plurality of frames, each frame including a plurality of macro blocks, said apparatus comprising:

a CPU for determining whether a picture type of a two adjacent frames is a B picture and conducting expansion processing of each frame among said two adjacent frames alternately for each one macro block; and a cache memory for storing a part of said plurality of macro blocks within the two adjacent frames to be referred to in said expansion processing.

10. A moving picture expansion apparatus for conducting expansion processing of compressed moving picture data having a plurality of frames, each frame including a plurality of macro blocks, said apparatus comprising:

a CPU for determining whether a picture type of a plurality of consecutive frames is a B picture and conducting expansion processing of each frame among said plurality of consecutive frames alternately for every plurality of macro blocks; and a cache memory for storing a part of said plurality of macro blocks within the consecutive frames to be referred to in said expansion processing.

11. A moving picture expansion apparatus for conducting expansion processing of compressed moving picture data having a plurality of frames, each frame including a plurality of macro blocks, said apparatus comprising:

a CPU for determining whether a picture type of two adjacent frames is a B picture and conducting expansion processing of each frame among said two adjacent frames alternately for every plurality of macro blocks; and a cache memory for storing a part of said plurality of macro blocks within the two adjacent frames to be referred to in said expansion processing.

12. The moving picture expansion apparatus according to any one of claim 8 through claim 11, said moving picture expansion apparatus further comprising:

means for conducting decoding of the Huffman code with reference to a variable-length code table;

means for reverse quantizing the decoded results of the Huffman code;

means for reverse discrete cosine transforming the reverse quantized results; and means for expanding a picture based on the reverse discrete cosine transformed results and motion vectors.

13. A storage medium storing a program executable by a machine for conducting expansion processing of compressed moving picture data having a plurality of frames, each frame including a plurality of macro blocks, said program comprising the steps of:

determining whether a picture type of a plurality of consecutive frames is a B picture; and conducting expansion processing of each frame among said plurality of consecutive frames alternately for each one macro block.

14. A storage medium storing a program executable by a machine for conducting expansion processing of compressed moving picture data having a plurality of frames, each frame including a plurality of macro blocks, said program comprising the steps of:

determining whether a picture type of two adjacent frames is a B picture; and conducting expansion processing of each frame among said two adjacent frames alternately for each one macro block.

15. A storage medium storing a program executable by a machine for conducting expansion processing of compressed moving picture data having a plurality of frames, each frame including a plurality of macro blocks, said program comprising the steps of:

determining whether a picture type of a plurality of consecutive frames is a B picture; and conducting expansion processing of each frame among said plurality of consecutive frames alternately for every plurality of macro blocks.

16. A storage medium storing a program executable by a machine for conducting expansion processing of compressed moving picture data having a plurality of frames, each frame including a plurality of macro blocks, said program comprising the steps of:

determining whether a picture type of two adjacent frames is a B picture; and conducting expansion processing of each frame among said two adjacent frames alternately for every plurality of macro blocks.

17. The storage medium according to any one of claim 12 through claim 16, said program for conducting expansion processing further comprising the steps of:

conducting decoding of the Huffman code with reference to a variable-length code table;

reverse quantizing the decoded results of the Huffman code;

reverse discrete cosine transforming the reverse quantized results; and expanding a picture based on the reverse discrete cosine transformed results and motion vectors.

18. A moving picture expansion method for conducting expansion processing of compressed moving picture data having a plurality of frames, each frame including a plurality of macro blocks, said method comprising a step of conducting expansion processing of each frame among a plurality of consecutive B picture type frames alternately for each one macro block.

19. A moving picture expansion method for conducting expansion processing of compressed moving picture data having a plurality of frames, each frame including a plurality of macro blocks, said method comprising a step of conducting expansion processing of each frame among a plurality of consecutive B picture type frames alternately for every plurality of macro blocks.

20. A moving picture expansion apparatus for conducting expansion processing of compressed moving picture data having a plurality of frames, each frame including a plurality of macro blocks, said apparatus comprising a CPU for conducting expansion processing of each frame among a plurality of consecutive B picture type frames alternately for each one macro block.

21. A moving picture expansion apparatus for conducting expansion processing of compressed moving picture data having a plurality of frames, each fame including a plurality of macro blocks, said apparatus comprising a CPU for conducting expansion processing of each frame among a plurality of consecutive B picture type frames alternately or every plurality of macro blocks.

* * * * *